United States Patent [19]
Ashkin et al.

[11] 3,774,121
[45] Nov. 20, 1973

[54] WAVELENGTH SELECTIVE LASER APPARATUS

[75] Inventors: Arthur Ashkin, Rumson; Erich Peter Ippen, Middletown, both of N.J.

[73] Assignee: Bell Telephone Laboratories, Incorporated, Murray Hill, Berkeley Heights, N.J.

[22] Filed: Dec. 13, 1971

[21] Appl. No.: 207,032

[52] U.S. Cl. ............. 331/94.5, 350/160 R, 350/161
[51] Int. Cl. ............................................. H01s 3/10
[58] Field of Search ................. 331/94.5; 350/160, 350/161; 178/7.6

[56] References Cited
UNITED STATES PATENTS

| | | | |
|---|---|---|---|
| 3,464,024 | 8/1969 | Bell et al. | 331/94.5 |
| 3,492,600 | 1/1970 | Zitter | 331/94.5 |
| 3,638,139 | 1/1972 | Ashkin | 331/94.5 |
| 3,443,243 | 5/1969 | Patel | 331/94.5 |
| 3,372,972 | 3/1968 | Schmidt et al. | 350/160 |
| 3,379,998 | 4/1968 | Soules et al. | 331/94.5 |
| 3,530,401 | 9/1970 | Garbuny et al. | 331/94.5 |
| 3,626,320 | 12/1971 | Garwin et al. | 331/94.5 |
| 3,639,854 | 2/1972 | Baldwin | 331/94.5 |

*Primary Examiner*—William L. Sikes
*Attorney*—W. L. Keefauver et al.

[57] ABSTRACT

A wavelength selective laser in which an active dye cell is pumped, a dispersion apparatus inside the laser resonator is used to disperse differing emitted wavelengths along distinct feedback paths in the resonator, and an absorption dye cell inside the resonator is used to selectively transmit the wavelengths to be resonated through low-loss apertures provided therein in response to incident bleaching beams of radiation moving across the resonator cross section. By electronically scanning the bleaching beams, the laser is electronically tuned. The apertures and the dispersion apparatus can be made an integral part of a single dye cell, in which case the wavelengths are selected for oscillation by scannable pumping beams providing movable gain apertures in the otherwise absorbing dye medium. Rapid electronic tuning in a system in which alignment problems are kept to a minimum makes the laser more desirable than similar prior art devices in numerous applications.

7 Claims, 4 Drawing Figures

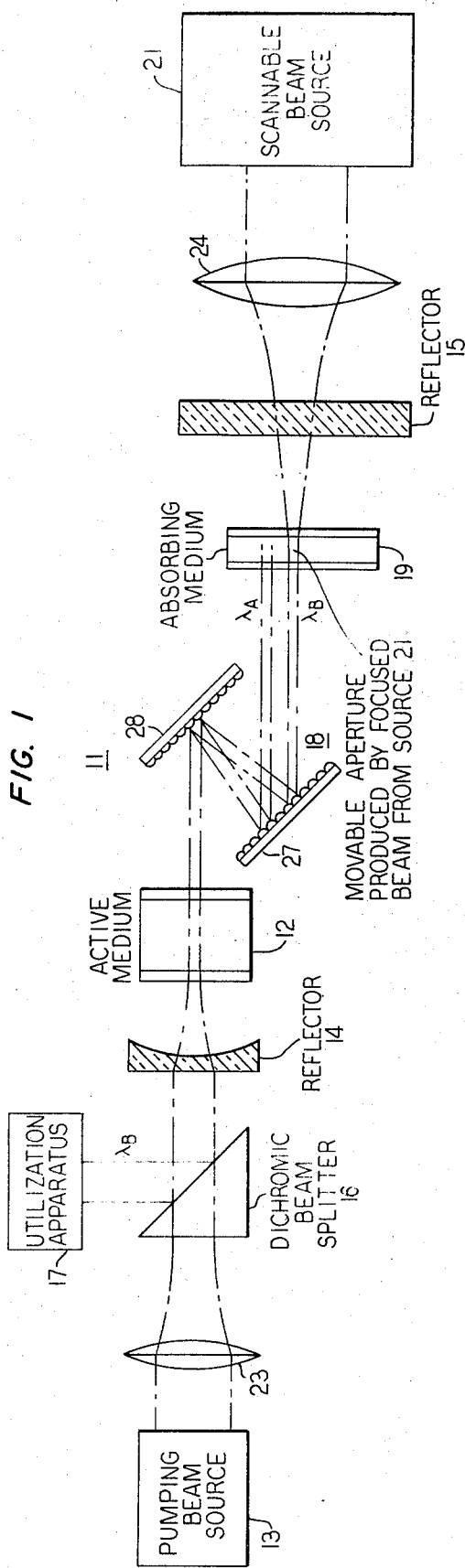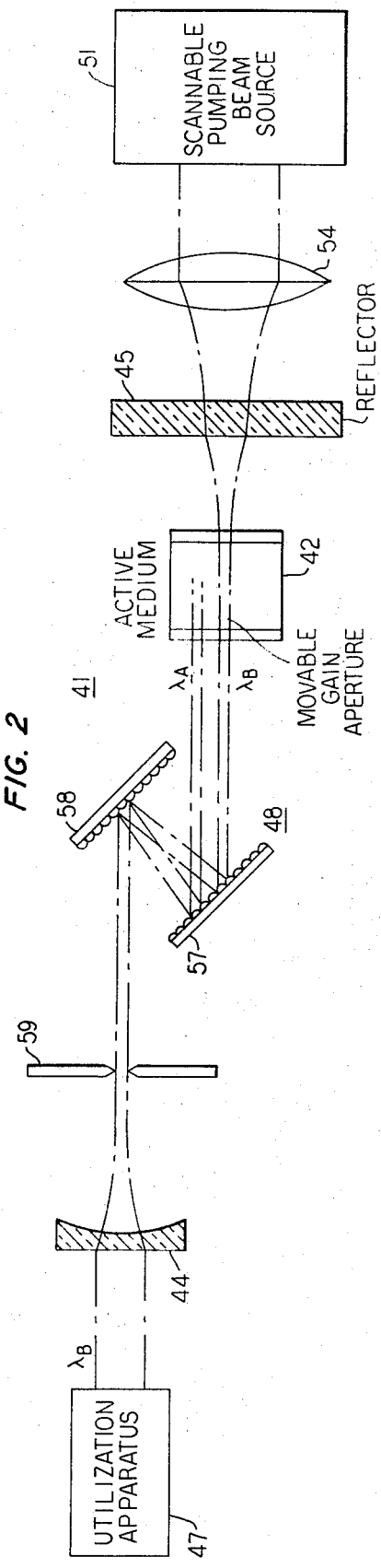

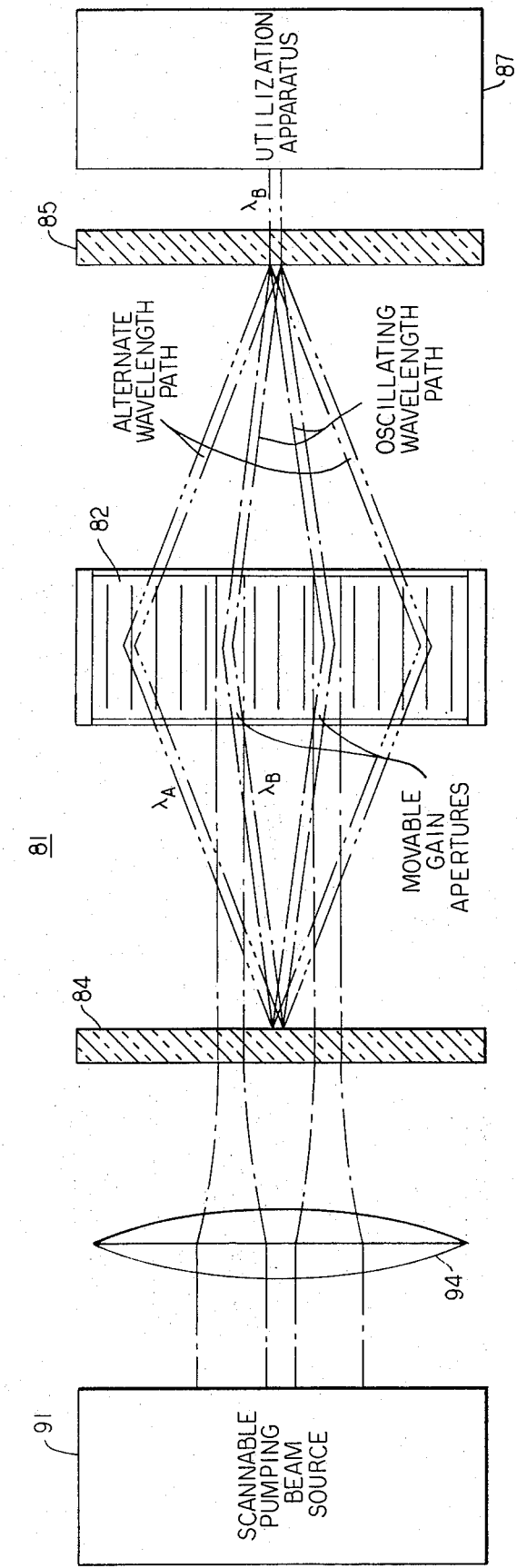

3,774,121

WAVELENGTH SELECTIVE LASER APPARATUS

BACKGROUND OF THE INVENTION

This invention relates to wavelength selection and tuning in an apparatus for the stimulated emission of radiation. More particularly, this invention relates to wavelength selection and tuning in optically pumped lasers operable at a plurality of oscillating wavelengths.

The recent development of apparatus which embodies the principles of amplification by the stimulated emission of radiation has extended the range of usable output to the infrared, visible and ultraviolet portions of the electromagnetic spectrum. These portions of the spectrum are frequently referred to as the optical range and the apparatus is frequently called a laser. Due to the development of a great variety of laser types, the apparatus is experiencing an ever-expanding scope of practical application and importance.

It is characteristic of various well-known laser media that a plurality of distinct radiative transitions take place simultaneously when the active atoms or molecules in the media are excited. In many applications, however, it is desirable that the laser operate with optimum power output at a single wavelength. As a result, many techniques have been devised in the laser art for selecting a single wavelength for oscillation and amplification in the laser resonator.

An example may be drawn from the dye laser field. Dye laser media, when pumped, typically emit optical radiation in a broad wavelength band of approximately 1,000 angstrom units or more (1 angstrom unit equals $10^{-10}$ meters). Arrangements for selecting wavelengths for oscillation and for tuning the lasers have been proposed including various combinations of wavelength selective gratings or prisms, acousto-optic devices, mirrors and apertures disposed internal or external to the laser resonator. These arrangements have, for the most part, experienced problems in practical applications. They are often quite complex and expensive and require precise alignment of components in the laser for effective operation. Most employ manual or mechanical adjustments of the components for tuning and therefore cannot respond rapidly to required changes in wavelength.

It is therefore an object of our invention to provide a relatively simple and reliable wavelength selective laser apparatus having a minimum number of components to be aligned and a rapid response in tuning.

SUMMARY OF THE INVENTION

In accordance with our invention, wavelength selection is provided by employing a wavelength dispersive apparatus in the laser resonator to disperse the differing laser wavelengths along distinct and laterally displaced feedback paths in the resonator, and an absorbing medium disposed in the resonator to intercept the paths and selectively transmit at least one of them for oscillation. The absorbing medium, typically an absorbing dye medium, transmits the paths through low-loss apertures provided therein in response to the incidence of focused scannable beams of radiation from an auxiliary source. By electronically scanning the beams laterally across the resonator cross section, the laser is electronically tuned. This rapid electronic tuning allows rapid response to required changes in wavelength during operation.

In one variation of our invention, the wavelength dispersive apparatus is provided as a structurally integral part of the active laser medium itself, and the differing wavelengths of laser radiation assume distinct ringlike feedback paths in the resonator. Wavelength selection is provided by an apertured means situated in the resonator which selects a single path for oscillation. The apertured means may be either a pair of movable simple apertures which allow manual or mechanical tuning of the laser, or more preferably, an absorbing medium in which the apertures are provided by focused scannable beams of radiation to allow rapid electronic tuning.

In still another variation of our invention, the wavelength selective apertures are provided in the active medium itself. This is accomplished by employing focused scannable beams of radiation to pump restricted regions of the active medium and therefore to produce movable gain apertures therein. Only the particular wavelength paths passing through these apertures are allowed to oscillate in the laser resonator and to be stimulated as output. In such arrangements, alignment problems in the lasers are kept to a minimum.

Various other modifications of the foregoing arrangements are disclosed or suggested.

BRIEF DESCRIPTION OF THE DRAWINGS

A more complete understanding of the foregoing and other features and advantages of our invention can be obtained from the following detailed description taken with reference to the accompanying drawings, in which:

FIG. 1 is a partially pictorial and partially schematic illustration of a first wavelength selective dye laser embodied according to our invention;

FIG. 2 shows a modification of the embodiment of FIG. 1 employing a single dye medium;

FIG. 4 shows a modified and simplified version of the embodiment of FIG. 3.

DESCRIPTION OF THE ILLUSTRATIVE EMBODIMENTS

Figure 3:
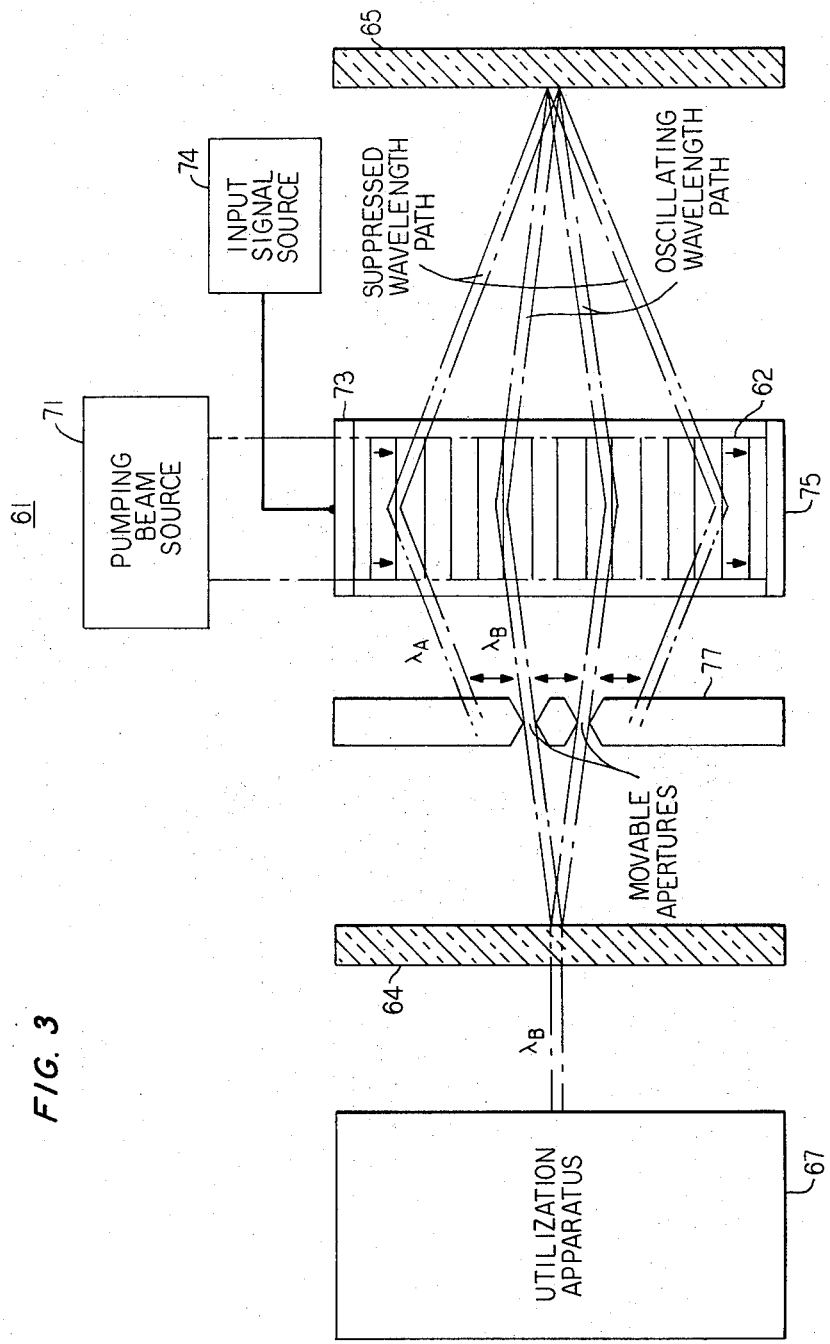
FIG. 3 is a partially pictorial and partially schematic illustration of a second wavelength selective dye laser embodied according to our invention in which the wavelength dispersive apparatus is integral with the dye medium.

In the illustrative embodiment of FIG. 1, there is shown a laser 11 pumped by pumping beam source 13 to provide an output beam for use in utilization apparatus 17. The laser 11 includes active medium 12 and the partially transmissive end reflectors 14 and 15 which form a resonator for the laser. Disposed within the resonator is dispersion apparatus 18 which angularly disperses differing wavelengths of the bidirectionally reflected laser radiation emitted from the pumped medium 12 along distinct paths in the resonator. The beams of differing wavelength are incident on absorbing medium 19 parallel to but laterally displaced from one another. Absorbing medium 19, illustratively including an appropriately saturable optical material, selectively transmits the wavelength in at least one of the paths through a low-loss aperture provided therein in response to the highly focused scannable beam of radiation from auxiliary source 21. Only the path of radiation transmitted through the aperture in absorbing medium 19 (the selected wavelength path $\lambda_B$ of the drawing) is allowed to oscillate in the laser resonator and therefore to be stimulated; the other paths (such as wavelength path $\lambda_A$) are substantially absorbed in medium 19 upon incidence. Accordingly, oscillations in paths other than path $\lambda_B$ are inhibited in the laser.

Dichromic beam splitter 16 diverts the output beam at wavelength $\lambda_B$ extracted from partially transmissive reflector 14 toward apparatus 17 for utilization.

Lenses 23 and 24 are used to focus the beams from source 13 and source 21, respectively, to small cross-sectional diameters in medium 12 and medium 19, respectively. When the low-loss aperture provided by the focused scannable beam in absorbing medium 19 is adjusted to approximately the size of a single wavelength laser path therein in a fundamental transverse mode, that aperture will select out a narrow spectral component within a broad laser band of medium 12. The lateral motion of the aperture in the laser resonator will allow tuning without affecting the other components of the laser.

Specifically, in the embodiment of FIG. 1, the active medium 12 is illustratively a dye cell including Rhodamine 6–G in either water or methanol as a solvent. As is well known, this dye solution is a very broad band laser medium. The cell of medium 12 may be made from Pyrex or fused silica and may include Brewster-angle end windows (not shown) disposed along the axis of the laser resonator. The concentration of the dye in the cell is adjusted to absorb substantially all of the incident pumping radiation from source 13. Such a dye medium, when pumped, exhibits optical gain for all wavelengths within the very broad band.

The pumping beam source 13 is illustratively an argon ion laser operating at 5,145 angstrom units (A) at a power level sufficient to pump medium 12 above lasing threshold. By focusing the pumping beam to a small diameter in medium 12 as shown in FIG. 1, the threshold required for oscillation is reduced. It is also noted that the threshold depends in part on the rate of flow of the dye in medium 12 which may be provided (by means not shown) to minimize bleaching effects of the dye and some thermal refractive index gradient effects. Dye medium 12, when pumped by the 5,145 A beam of sufficient intensity, typically emits radiation in the broad wavelength range of approximately 5,500 A – 6,500 A.

Although the pumping arrangement shown in FIG. 1 is longitudinal (along the axis of the laser resonator), it should be noted that a transverse pumping arrangement could also be employed. In the latter, pumping beam source 13 would be adjacent to medium 12 and the beam incident thereon in a direction transverse to the axis of the resonator. A fixed aperture or lens could then be positioned between medium 12 and dispersion apparatus 18 in the resonator to maintain a small cross-sectional diameter for the laser beam and to fix the position of the oscillating modes in the laser. In a transverse pumping arrangement, source 13 could be a flashlamp instead of another laser.

Absorbing medium 19 also illustratively comprises a dye cell including a solution of Cresyl Violet dye and either water or methanol. The solution is caused to flow through the cell means not shown. The dye concentration in the cell of medium 19 is adjusted so that, in the absence of the beam from source 21, the medium substantially absorbs all the wavelengths in the broad wavelength band of dye medium 12.

Source 21 is again illustratively an argon ion laser emitting a beam of 5,145 A with an intensity sufficient to saturate the absorption of or to bleach the dye in medium 19. The localized bleaching by the scannable 5,145 A beam substantially reduces the degree of absorption by the dye in a localized region of medium 19 and therefore allows a substantial portion of radiation of a particular wavelength and in a particular path incident on that area to pass and oscillate in the resonator. Accordingly, the operation of lasers embodied according to our invention depends in part upon the fact that a bleached dye, or a dye in which the absorption is saturated, has a pass band that encompasses most of the oscillatory band of active medium 12.

Source 21 also includes means for scanning the beam across the resonator cross section. Such beam scanning means are well known to those skilled in the laser art and include both mechanical means and electronic means.

Mechanical scanning means typically employ an arrangement of mirrors, lenses or prisms which are mechanically adjustable to provide controlled lateral displacement in the laser resonator of an incident laser beam from source 21. Electronic scanning means might employ an electro-optic material such as potassium dihydrogen phosphate (KDP) which has the property that its refractive index can be varied by applying an electric field. A laser beam passing through the material can be continuously deflected through various angles depending upon the magnitude of the applied field in the material. An appropriate lens arrangement, within source 21, can be used to convert the continuous angular deflection of the laser beam into continuous lateral displacement of the beam across the resonator cross section.

Rapid electronic scanning of the beam from source 21 allows rapid electronic tuning of the laser. Lasers which can be electronically tuned according to our invention without the need for mechanical adjustment would be desirable in numerous practical applications in the laser art.

Reflector 14 is illustratively a focusing or spherical type selected and arranged to provide a small beam waist for the pumping radiation and the dye laser radiation in medium 12. Reflector 15 is illustratively planar so that its surface perpendicularly intersects the oscillating radiation path for each selected wavelength. Both reflectors typically have broad band reflection coatings and a transmission close to unity for the wavelengths of source 13 and source 21, i.e., 5,145 A. Reflector 14 is also partially transmissive over the broad band so that an output beam can be extracted for utilization.

While a planar configuration for reflector 15 is preferable when an electronic scanning means in source 21 is employed to obtain rapid electronic tuning without the need for mechanical adjustment, a focusing or spherical configuration for reflector 15 may be desirable for other reasons. Such a reflector would maintain the small beam waist for the oscillating wavelength in medium 19 and therefore facilitate the selection by the focused beam from source 21 of a narrow spectral component within the broad dye laser band. The focusing reflector could then be pivotable about axes normal to the plane of FIG. 1, and for various angular adjustments of the reflector about the axis, its surface will perpendicularly intersect the selected path.

Dispersion apparatus 18 is shown in the embodiment of FIG. 1 as a pair of reflection gratings 27 and 28. The gratings typically include plastic grating elements bonded on a glass substrate with an aluminized surface or other reflective coating thereon. The gratings may also be pivotal about an axis normal to the plane of FIG. 1 to enable adjustment. The differing wavelengths of the dye laser beam incident on the gratings will be reflected at various angles related in general to the beam wavelength, its angle of incidence, and the grating element spacing.

By using the relative orientation of grating reflectors 27 and 28 shown in FIG. 1, the differing wavelength beams can be made to propagate in parallel and laterally displaced directions in the laser resonator. Alternative means well known in the art for accomplishing this result would employ one or more wavelength dispersive prisms or a single holographic transmission grating disposed in the path of the multiwavelength laser beam.

FIG. 2 illustrates, by way of example, a simplified version of the laser of FIG. 1 taking advantage of the broad band loss and broad band gain characteristics of a single dye medium to achieve the desired wavelength selection and tuning. The constituents of the embodiment of FIG. 2 that are substantially similar to those of FIG. 1 are referenced by numerals 30 units higher.

Specifically, in the embodiment of FIG. 2, laser 41 includes active medium 42 situated between partially transmissive end reflectors 44 and 45 which form a resonator for the laser. The pumping of medium 42 is achieved by the highly focused beam from the scannable pumping beam source 51 to provide an output beam for utilization in apparatus 47. Positioned in the laser resonator to intercept the emitted radiation from medium 42 is dispersion apparatus 48 typically comprising grating reflectors 57 and 58. Apparatus 18 operates to spatially separate in the resonator the beams of radiation of differing wavelengths. Only the wavelength path passing through the restricted pump region of medium 42 (selected wavelength path $\lambda_B$ of the drawing) will experience gain and be allowed to oscillate in the resonator. The situation may be described as a movable gain aperture in the otherwise absorbing medium of laser 42. The other wavelength paths (path $\lambda_A$) will see no gain in the medium and will be at least partially absorbed thereby. Accordingly, oscillations in paths other than that of $\lambda_B$ are inhibited.

Active medium 42 is illustratively a dye cell including a flowing aqueous solution of Rhodamine 6–G similar to that of medium 12 of FIG. 1. The dye concentration is adjusted to have maximum absorption for the incident pumping radiation (illustratively the 5,145 A beam from focused argon ion laser source 51). It is not necessary that the dye effectively absorb all of the excited wavelengths in its own broad laser emission band since only the wavelength path selected by the focused pumping beam in the movable gain aperture of medium 42 will experience gain due to multiple passes through the laser. Aperture 59, positioned near reflector 49, is a fixed aperture and serves to fix the position of the oscillating modes in the resonator.

The embodiment of FIG. 2 has all the advantages basic to the embodiment of FIG. 1 plus the feature of a simplified construction with a minimum number of components to be aligned.

Another variation of our invention is shown in the illustrative embodiment of FIG. 3. In this arrangement, the wavelength dispersive means is provided as a structurally integral part of the active medium itself and the differing laser wavelength beams are allowed to assume distinct ringlike re-entrant paths in the resonator during operation. Wavelength selection and tuning is then provided by means of movable apertures situated in the laser resonator.

In particular, in FIG. 3, laser 61 includes active medium 62 disposed between planar end reflectors 64 and 65 and pumped by pumping beam source 71. The source 71 illustratively supplies a pumping beam incident on medium 62 perpendicular to or at an angle to the plane of the drawing. An output beam is extracted from partially transmissive reflector 64 for utilization in apparatus 67. The medium 62 is again typically a dye cell including a flowing solution of Rhodamine 6–G in water, and the pumping source an argon ion laser at 5,145 A. Situated at one end of medium 62 is acoustical wave transducer 73 which may comprise a thin plate of lithium niobate or zinc oxide. Coupled to transducer 73 is source 74 of an input signal of a variable frequency, for example, a microwave frequency signal. Situated at the other end of medium 62 is acoustical wave load 75.

Transducer 73 transmits an acoustical wave which propagates through medium 62 in a direction transverse to the axis of the laser resonator. The acoustical wave induces a transverse periodic variation in the optical index of refraction of the medium which can be considered to be a moving diffraction grating. The optical radiation beams oscillating in the resonator interact with the acoustical wave and will be scattered therefrom toward the laser axis at the Bragg angle. The differing wavelength beams will therefore tend to assume distinct ringlike feedback paths in the resonator as shown for two such wavelengths $\lambda_A$ and $\lambda_B$ in FIG. 3.

By employing the double-apertured apparatus 77 having apertures of sufficiently small diameter, a narrow spectral component (path $\lambda_B$) can be selected out of the broad dye emission band. The other wavelength paths ($\lambda_A$) are then suppressed in the laser. By moving the apertures of apparatus 77 laterally either both toward or both away from the resonator axis (employing means not shown), the laser is tuned. Another degree of tuning is provided simply by maintaining the apertures of apparatus 77 fixed and varying the frequency of the input signal from source 74.

It should be noted that in the embodiment of FIG. 3 the optical radiation that is Bragg reflected from the acoustical grating is first upshifted in frequency by the frequency of the acoustical wave as it travels from left to right in the resonator, and then downshifted by the acoustical frequency as it travels from right to left in the resonator. This is because the oscillating radiation path first sees the acoustical beam moving toward it and then sees the acoustical beam moving away. Laser 61, therefore, by employing the ringlike feedback arrangement, avoids the continuous upshifting of the resonated frequency that is inherent in some prior art acousto-optic laser tuning schemes.

Numerous other variations are possible in the embodiment of FIG. 3 itself. For example, load 75 could be reflective for the acoustical wave so as to provide a standing acoustical wave in medium 62 and a fixed acoustical grating therein. The wavelength selection and the tuning is then provided solely by use of the movable double-apertured apparatus 77.

It is also possible to eliminate the use of acoustical waves completely in laser 61. Active medium 62 could comprise a material such as a dichromated gelatin or polymethylmethacrylate (PMMA) doped with an active dye and including, as an integral part thereof, a fixed transverse diffraction grating. The gelatin or PMMA could be in either bulk or thin film form. Manual or mechanical adjustment of apparatus 77 (by means not shown) could then be employed to provide the tuning.

Additionally, it should be noted that the movable double-apertured apparatus 77 of FIG. 3 may comprise an absorbing dye medium identical to medium 19 of FIG. 1. A scannable beam source with two highly focused output beams could be used to bleach the dye in the medium in localized regions thereof and to provide the movable low-loss apertures therein. In such an arrangement, an electronic scanning means for the two beams would be provided to electronically tune the laser without the need for mechanical adjustment.

A simplified version of the last described variation of the embodiment of FIG. 3 is shown in FIG. 4. Laser 81, like laser 41 of FIG. 2, utilizes the broad band gain and broad band loss characteristics of laser dyes in a single dye medium 82 situated between planar end reflectors 84 and 85. Medium 82 is illustratively a dye-doped dichromated gelatin or PMMA medium with a fixed transverse grating. The movable gain apertures provided by the two highly focused beams (by lens 94) from scannable pumping beam source 91 select only the wavelength path $\lambda_B$ as shown in the drawing, which path is extracted from reflector 85 for utilization in apparatus 87. For the illustrated pumping beam positions, no oscillations along path $\lambda_A$ will occur. However, by moving the pumping beams both laterally away from the resonator axis so as to coincide with the regions of medium 82 traversed by the alternative wavelength path $\lambda_A$, oscillation will be provided at that wavelength. In other respects, laser 81 is similar to lasers 41 and 61 described hereinabove.

Numerous other variations of the foregoing embodiments of our invention should be apparent to those skilled in the laser art. For example, numerous other dye media are available both for active media and absorbing media of the lasers. It is also possible to select a discrete set of wavelengths rather than a single wavelength, for example, for use in a frequency multiplexing system, simply by employing a larger number of scannable beams in the lasers. In each particular case, the optimum selection, arrangement, and mode of operation of the various constituents of the embodiments of the lasers are best determined experimentally in conjunction with the basic descriptions contained herein.

It should be further noted that in this respect that it is not necessary that the pumped active medium in each of the previous embodiments by a dye laser medium. For example, the embodiment of FIG. 1 could include an active gas or vapor medium emitting optical radiation at a plurality of wavelengths and an absorbing medium having an appropriate absorption band encompassing these wavelengths. In the other embodiments of our invention, it is merely necessary that the active medium be an optically pumpable laser medium capable of operating at a plurality of oscillating wavelengths.

We claim:

1. Apparatus for the stimulated emission of radiation comprising an active medium which emits, when pumped, optical radiation simultaneously at a plurality of differing wavelengths, means for pumping said active medium to provide said simultaneous emission, an optical resonator disposed about said active medium to resonate the differing wavelengths, and means disposed within said resonator for dispersing the differing wavelengths along distinct paths in at least a portion of said resonator, said pumping means comprising means for producing at least one beam of radiation and for introducing said beam into said resonator, means for focusing said beam to a small cross-sectional diameter in said active medium, and means for scanning said beam across the cross section of said active medium to selectively transmit and stimulate the wavelength in at least one of said paths through a movable gain aperture provided in said active medium in coincidence with the incidence of said sannable pumping beam.

2. Apparatus for the stimulated emission of radiation comprising an active medium which emits, when pumped, optical radiation simultaneously at a plurality of differing wavelengths, means for pumping said active medium to provide said emission, an optical resonator disposed about said active medium to resonate the differing wavelengths, means for dispersing the differing wavelengths along distinct and laterally displaced paths through said active medium, said pumping means comprising means for producing a beam of radiation and for introducing said beam into said resonator, means for focusing said beam to a small cross-sectional diameter in said active medium, and means for scanning said beam across the cross section of said active medium to selectively transmit and stimulate the wavelength in at least one of said paths through a movable gain aperture provided in said active medium in coincidence with the incidence of said scannable pumping beam.

3. An apparatus according to claim 2 in which said active medium is a dye laser medium.

4. Apparatus according to claim 3 in which said active dye medium comprises a dye cell including a flowing solution of the dye.

5. Apparatus for stimulated emission of radiation comprising an active medium which emits, when pumped, optical radiation simultaneously at a plurality of differing wavelengths, means for pumping said active medium to provide said emission, an optical resonator disposed about said active medium to resonate the differing wavelengths, said active medium including periodic variations in the transmission characteristics thereof in a direction transverse to the axis of said resonator, said variations deflecting said radiation resonating in said resonator continuously toward the resonator axis at angles related to the wavelength of said radiation, said differing wavelengths of said radiation assuming distinct ringlike re-entrant paths in said resonator, said pumping means comprising means for producing two beams of radiation and for introducing said beams into said resonator, means for focusing said two beams to a small cross-sectional diameter in said active medium, and means for scanning said two beams across the cross section of said active medium laterally away from and toward the resonator axis, said active medium selectively transmitting and stimulating the wavelength in at least one of said paths through movable gain apertures provided therein in coincidence with the incidence of said two scannable pumping beams.

6. Apparatus according to claim 5 in which said active medium is a dye laser medium.

7. Apparatus according to claim 6 in which said active dye medium comprises a dye cell including a flowing solution of the dye.

* * * * *